US012340647B2

(12) United States Patent
Kumagai

(10) Patent No.: US 12,340,647 B2
(45) Date of Patent: Jun. 24, 2025

(54) BANKNOTE PROCESSING SYSTEM AND BANKNOTE PROCESSING MANAGEMENT METHOD

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventor: Hiroyuki Kumagai, Tokyo (JP)

(73) Assignees: LAUREL BANK MACHINES CO., LTD., Tokyo (JP); LAUREL MACHINERY CO., LTD., Osaka (JP); LAUREL PRECISION MACHINES CO., LTD., Osaka (JP)

( * ) Notice: Subject to any disclaimer, the term of this patent is extended or adjusted under 35 U.S.C. 154(b) by 669 days.

(21) Appl. No.: 17/641,773

(22) PCT Filed: Sep. 11, 2019

(86) PCT No.: PCT/JP2019/035607
§ 371 (c)(1),
(2) Date: Mar. 9, 2022

(87) PCT Pub. No.: WO2021/048934
PCT Pub. Date: Mar. 18, 2021

(65) Prior Publication Data
US 2023/0154268 A1 May 18, 2023

(51) Int. Cl.
*G07D 11/50* (2019.01)
*B65H 31/24* (2006.01)
(Continued)

(52) U.S. Cl.
CPC .............. *G07D 11/50* (2019.01); *B65H 31/24* (2013.01); *B65H 39/115* (2013.01); *G06Q 20/34* (2013.01);
(Continued)

(58) Field of Classification Search
CPC ........ G07D 11/50; G07D 11/13; G07D 11/24; G07D 11/32; G07D 11/30; G07D 11/18;
(Continued)

(56) References Cited

U.S. PATENT DOCUMENTS

2003/0236589 A1* 12/2003 Myatt ................ G07D 11/0087
700/223
2007/0095898 A1 5/2007 Uno et al.
(Continued)

FOREIGN PATENT DOCUMENTS

EP 2 782 076 A1 9/2014
JP 2000-503956 4/2000
(Continued)

OTHER PUBLICATIONS

Extended European Search Report mailed Apr. 25, 2023 in European Application No. 19944725.1, 8 pages.
(Continued)

*Primary Examiner* — Luis A Gonzalez
(74) *Attorney, Agent, or Firm* — Nixon & Vanderhye P.C.

(57) ABSTRACT

Provided are an imaging unit capable of imaging a banknote processing device and a periphery of a transaction operation clerk who is operating the banknote processing device and a recording unit that records imaging data of the imaging unit, an identification number that is visually identifiable is inscribed on at least one surface of a partition card, the imaging unit is capable of imaging the identification number, and the recording unit records imaging data of the imaging.

5 Claims, 3 Drawing Sheets

(51) Int. Cl.
*B65H 39/115* (2006.01)
*G06Q 20/34* (2012.01)
*G07D 11/13* (2019.01)
*G07D 11/24* (2019.01)
*G07D 11/32* (2019.01)

(52) U.S. Cl.
CPC .............. *G07D 11/13* (2019.01); *G07D 11/24* (2019.01); *G07D 11/32* (2019.01); *B65H 2301/424* (2013.01); *B65H 2408/111* (2013.01); *B65H 2701/18267* (2013.01); *B65H 2701/1912* (2013.01); *G07D 2211/00* (2013.01)

(58) Field of Classification Search
CPC .................. G07D 11/235; G06Q 20/34; B65H 2701/1912
See application file for complete search history.

(56) References Cited

U.S. PATENT DOCUMENTS

| 2007/0205256 | A1 | 9/2007 | Uno et al. |
| 2010/0082150 | A1* | 4/2010 | Tokushige ............. G07D 11/50 700/224 |
| 2014/0262980 | A1* | 9/2014 | Nakada .................. G07D 11/30 209/583 |
| 2015/0339874 | A1 | 11/2015 | Kusano |
| 2018/0276934 | A1 | 9/2018 | Mihara |

FOREIGN PATENT DOCUMENTS

| JP | 2006-58939 | 3/2006 |
| JP | 2015-222488 | 12/2015 |
| JP | 2016-71579 | 5/2016 |
| JP | 2017-62862 | 3/2017 |
| JP | 2018-160013 | 10/2018 |
| RU | 2 488 887 | 7/2013 |
| WO | 98/05006 | 2/1998 |

OTHER PUBLICATIONS

Office Action for RU Application No. 2020121335 mailed Jan. 26, 2021, 16 pages (with English Translation).
International Search Report for PCT/JP2019/035607 dated Oct. 21, 2019, 5 pages (with English Translation).
Written Opinion of the ISA for PCT/JP2019/035607 dated Oct. 21, 2019, 5 pages.

* cited by examiner

BANKNOTE PROCESSING SYSTEM AND BANKNOTE PROCESSING MANAGEMENT METHOD

This application is the U.S. national phase of International Application No. PCT/JP2019/035607 filed Sep. 11, 2019 which designated the U.S., the entire contents of which are hereby incorporated by reference.

TECHNICAL FIELD

The present invention relates to a banknote processing system and to a banknote processing management method.

BACKGROUND ART

Among money processors, there is one in which money is set in a money batch state with separator cards arranged between adjacent money groups, with the money set in such a money batch state being continuously taken in and counted (for example, refer to Patent Document 1). In this money processor, each money heap is recognized by the separator card.

PRIOR ART DOCUMENTS

Patent Documents

[Patent Document 1] Published Japanese Translation No. 2000-503956 of the PCT International Publication

SUMMARY OF INVENTION

Problem to be Solved by the Invention

Diversification of management information is sought after in a banknote processing system.

An object of the present invention is to provide a banknote processing system and a banknote processing management method that enable diversification of management information.

Means for Solving the Problem

A first aspect according to the present invention includes: a banknote processing device, the banknote processing device including a loading unit in which a banknote block is set together with a partition card, the banknote block including stacked banknotes, the partition card being arranged on one of outer sides of the banknote block in a stacking direction, an identification unit that identifies the banknotes and the partition card taken in from the loading unit, a stacking unit for stacking banknotes identified as normal banknotes by the identification unit, and a reject unit for removing reject banknotes identified as other than the normal banknotes by the identification unit and the partition card; an imaging means capable of imaging the banknote processing device and a periphery of a transaction operation clerk who is operating the banknote processing device; and a recording means that records imaging data of the imaging means. An identification number that is visually identifiable is inscribed on at least one surface of the partition card, the imaging means is capable of imaging the identification number, and the recording means records imaging data of the imaging.

A second aspect of the present invention further includes: a detection means that detects that the banknote processing device has started a counting operation in a state in which the imaging means has not imaged the identification number; and a notification means that issues an alarm when the detection means detects such.

A third aspect of the present invention further includes: a detection means that detects that the banknote processing device has started a counting operation in a state in which the imaging means has not imaged the identification number; and a control means that invalidates the counting operation of the banknote block corresponding to the partition card newly detected by the identification unit when the detection means detects such.

A fourth aspect of the present invention is such that the imaging means is further capable of imaging a higher-order terminal device connected as a higher-order component to the banknote processing device and a periphery of an operator of the higher-order terminal device, in addition to the banknote processing device and the periphery of the transaction operation clerk, and the recording means further records imaging data of the imaging.

A fifth aspect of the present invention is such that a base color of one surface of the partition card is white and a base color of another surface of the partition card is colored, the imaging means is capable of imaging a scene in which a block including the partition card and the reject banknotes extracted from the reject unit is reset in the loading unit, and the recording means stores imaging data of the imaging.

A sixth aspect of the present invention is a banknote processing method for when performing banknote processing using a banknote processing system, the banknote processing system including: a banknote processing device, the banknote processing device including a loading unit in which a banknote block is set together with a partition card, the banknote block including stacked banknotes, the partition card being arranged on one of outer sides of the banknote block in a stacking direction, an identification unit that identifies the banknotes and the partition card taken in from the loading unit, a stacking unit for stacking banknotes identified as normal banknotes by the identification unit, and a reject unit for removing reject banknotes identified as other than the normal banknotes by the identification unit and the partition card; an imaging means; and a recording means that records imaging data of the imaging means. As the partition card, a partition card on at least one surface of which an identification number that is visually identifiable is inscribed is used. Along with this, when the banknote block is set in the loading unit, causing the imaging means to image the identification number of the partition card arranged on one outer side of the banknote block in a stacking direction and causing the recording means to record therein imaging data of the imaging.

Effect of the Invention

According to the present invention, it is possible to provide a banknote processing system and a banknote processing management method that enable diversification of management information.

EMBODIMENTS FOR CARRYING OUT THE INVENTION

Figure 1:
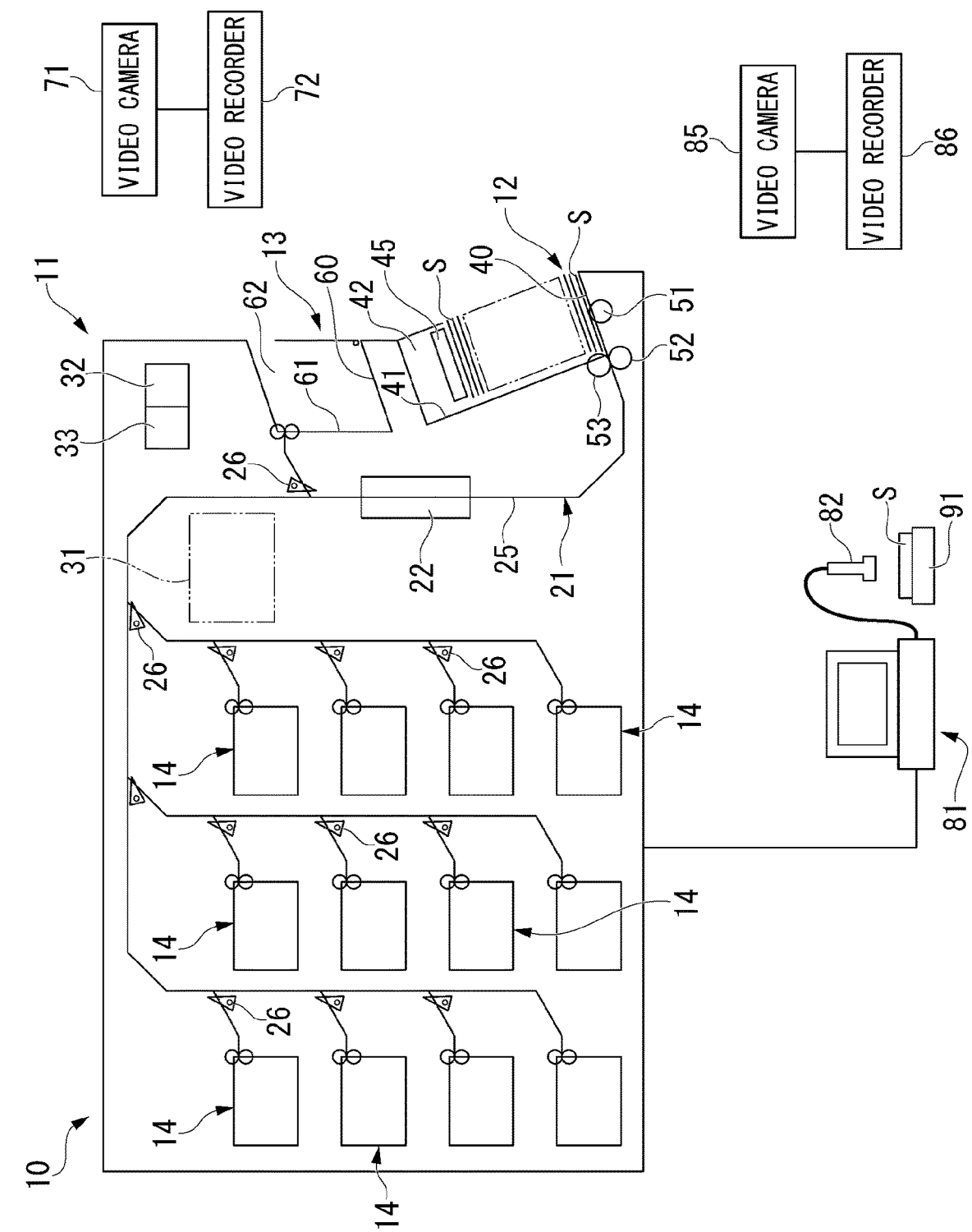
FIG. 1 is an outline block diagram showing a banknote processing system of an embodiment.

Embodiments of the present invention will be described below with reference to the drawings. A banknote processing system 10 of a present embodiment shown in FIG. 1 is installed in a cash center of a financial institution and used for collating, for example, money totals given on sales slips and the total amount of banknotes collected and brought in.

The banknote processing system 10 includes a banknote processing device 11. The banknote processing device 11 performs a predetermined process on paper sheets S that have been loaded therein. Specifically, the banknote processing device 11 performs an identification process on banknotes S(a) to be processed shown in FIG. 2 as the paper sheets S. The banknote processing device 11 shown in FIG. 1 performs a process of identifying the banknotes S(a), counting the banknotes S(a) by denomination, and calculating the total amount of money.

Hereinbelow, in the banknote processing device 11, the side on which the transaction operation clerk performing a transaction operation on the banknote processing device 11 mainly stands is denoted as "front", the opposite side is denoted as "back", the right side from the viewpoint of the transaction operation clerk is denoted as "right", and the left side from the viewpoint of the transaction operation clerk is denoted as "left". The banknote processing device 11 of FIG. 1 is viewed from the front.

Figure 2:
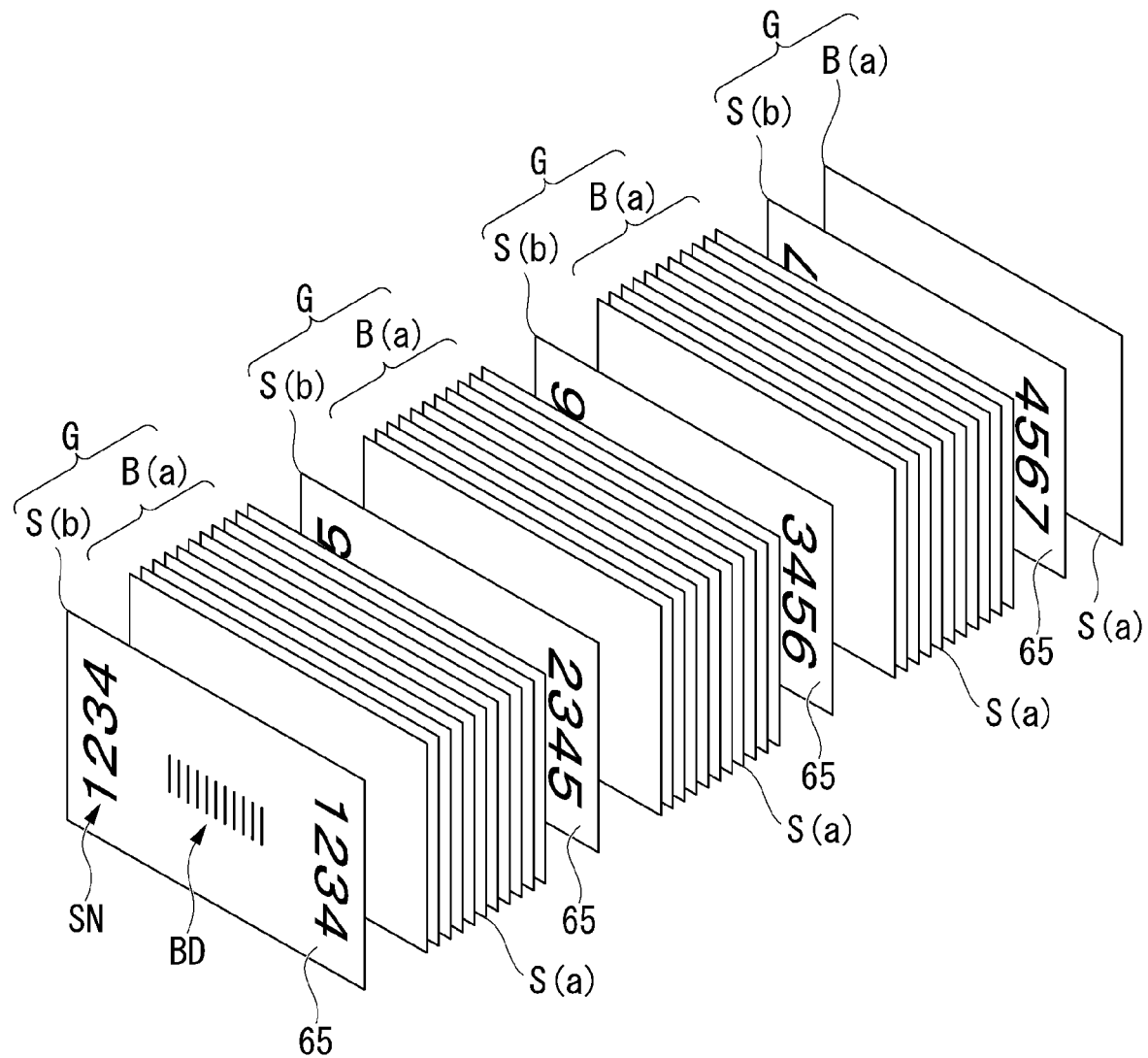
FIG. 2 is a perspective view showing banknotes and partition cards processed by the banknote processing system of the embodiment.

As shown in FIG. 2, the banknote processing device 11 collectively processes banknote blocks B(a) together with partition cards S(b) which serve as paper sheets S. The banknote block B(a) is formed by continuously stacking a plurality of banknotes S(a) in the thickness direction, with the long sides and the short sides thereof respectively aligned. The partition card S(b) is arranged on one of the outer sides of the banknote block B(a) in the stacking direction, with the long sides and short sides thereof being respectively aligned with those of the banknotes S(a) constituting the banknote block B(a). The partition card S(b) is used to determine the boundaries of banknote blocks B(a), and constitutes a part of the banknote processing system 10. Here, each banknote block B(a) is constituted by banknotes S(a) gathered together for each batch processing unit. The banknote block B(a) is often constituted by stacking a plurality of banknotes S(a) as described above, but also may be composed of just one banknote S(a).

As shown in FIG. 1, the banknote processing device 11 includes a loading unit 12, a reject unit 13, and a stacking unit 14. The loading unit 12 is provided at a lower portion of the right side surface of the banknote processing device 11 and opens to the right side and front of the banknote processing device 11. The reject unit 13 is provided at an intermediate portion in the vertical direction on the right side surface of the banknote processing device 11 and opens to the right side and front of the banknote processing device 11. The stacking unit 14 is disposed on the left side of the loading unit 12 and the reject unit 13 and opens to the front surface of the banknote processing device 11. A plurality of (specifically, 12) stacking units 14 are provided.

The paper sheets S are set in the loading unit 12 in a state of being stacked vertically, with the long sides and the short sides being respectively aligned. In the loading unit 12, for example, the banknote block B(a) obtained by stacking the banknotes S(a) shown in FIG. 2 is set together with the partition card S(b) arranged on one of the outer sides of the banknote block B(a) in the stacking direction. The loading unit 12 separates and feeds out the set paper sheets S one by one from the bottom one, and takes each fed out paper sheet S into the banknote processing device 11.

As shown in FIG. 1, a transport unit 21 and an identification unit 22 are provided inside the banknote processing device 11. The transport unit 21 transports, within the banknote processing device 11, the paper sheets S taken in from the loading unit 12. The identification unit 22 identifies the paper sheets S that is being transported by the transport unit 21. The identification unit 22 identifies whether each paper sheet S is a partition card S(b) or a banknote S(a) other than the partition card S(b), and in the case of being a banknote S(a), identifies whether the banknote is a normal banknote S(a) to be counted or a reject banknote S(a) other than the normal banknote S(a). When the banknote S(a) is a normal banknote S(a), the identification unit 22 identifies the denomination or the like while counting the banknote S(a). Therefore, the identification unit 22 identifies the banknote S(a) taken in from the loading unit 12 and the partition card S(b) taken in from the loading unit 12.

The identification unit 22 performs the aforementioned identification by acquiring image data of each paper sheet S or the like. When barcode data BD is included in the image data of the paper sheet S, the identification unit 22 identifies this as the partition card S(b). The identification unit 22 converts the barcode data BD, which is image data, into character data according to prescribed rules based on the thickness and arrangement of each line.

The transport unit 21, at a portion downstream of the identification unit 22, selectively distributes the paper sheets S to any one of the reject unit 13 and the plurality of stacking units 14 based on the identification result of the identification unit 22. The transport unit 21 includes a transport path 25 that is arranged in a manner appropriately separated so as to connect the respective units and that transports the paper sheets S, and a plurality of sorting units 26 that are provided at each branch position of the transport path 25 and sort the paper sheets S.

The reject unit 13 excludes, among the paper sheets S taken into the banknote processing device 11 by the loading unit 12, reject banknotes S(a) identified as other than normal banknotes S(a) to be counted and the partition cards S(b) so as to be removed to outside the banknote processing device 11. The reject unit 13 stacks the paper sheets S fed from the transport unit 21 from bottom to top in the feeding order (in other words, the order of being taken in from the loading unit 12). In the reject unit 13, the paper sheets S fed out from the loading unit 12 are oriented such that the surface of each that was facing down in the loading unit 12 is facing up.

The plurality of stacking units 14 stack the normal banknotes S(a) identified by the identification unit 22 as normal counting targets among the banknotes S(a) taken into the banknote processing device 11 by the loading unit 12 so as to be removable to the outside of the banknote processing device 11. Each of the plurality of stacking units 14 stacks the banknotes S(a) fed out from the transport unit 21 from bottom to top in the feeding order (in other words, the order of being taken in from the loading unit 12). In each of the plurality of stacking units 14, the paper sheets S fed out from the loading unit 12 are oriented such that the surface of each that was facing down in the loading unit 12 is facing up.

An operation display unit 31 (notifying means) that receives an operation input and displays information and outputs a voice is provided on the front surface of the banknote processing device 11. A control unit 32 (detection means, control means) that controls each unit and a storage unit 33 that stores master data serving as a reference for identification and data of identification count results are provided inside the banknote processing device 11.

The loading unit 12 is provided on the right side surface of the banknote processing device 11 so as to open to the right side and the front as described above. The loading unit 12 includes a bottom portion 40 that is arranged to be inclined slightly downward to the left with respect to the horizontal, a wall portion 41 extending perpendicularly upward, with respect to the bottom portion 40, from the left end edge position of the bottom portion 40, and a wall portion 42 extending perpendicularly upward, with respect to the bottom portion 40, from the back end edge portion of the bottom portion 40. The wall portion 41 is arranged to be perpendicular to the wall portion 42. The bottom portion 40 and the wall portion 41 extend in the front-back direction. The wall portion 42 extends perpendicularly with respect to the front-back direction. The paper sheets S are placed on the bottom portion 40 of the loading unit 12.

The paper sheets S, which have a rectangular shape, are set in the loading unit 12 so that the long sides of each follow the wall portion 41, and the short sides follow the wall portion 42. In other words, the paper sheets S are set in the loading unit 12 such that the long sides are perpendicular to the wall portion 42 and the short sides are perpendicular to the wall portion 41. The loading unit 12 includes a bill press 45 that is provided above the bottom portion 40 and that moves up and down along the wall portion 41. The bill press 45 presses the paper sheets S placed on the bottom portion 40 toward the bottom portion 40.

The loading unit 12 includes a kick-out roller 51, a take-in roller 52, and a separation roller 53. The kick-out roller 51 kicks out the lowermost paper sheet S among the paper sheets S set on the bottom portion 40 toward the transport unit 21. The take-in roller 52 takes in the paper sheet S kicked out by the kick-out roller 51 into the inside of the banknote processing device 11 and transfers the paper sheet S to the transport unit 21. The separation roller 53 separates the sheets S taken in by the take-in roller 52 one by one.

A paper sheet group G in which at least one banknote S(a) and a partition card S(b) are overlapped is set in the loading unit 12. The loading unit 12 takes in the sheet group G into the banknote processing device 11. The loading unit 12 is provided on the right side surface of the above banknote processing device 11 so as to open rightward.

The reject unit 13 is provided on the right side surface of the banknote processing device 11 so as to open to the right side and front as described above. The reject unit 13 includes a bottom portion 60 that is arranged to be inclined slightly downward to the left with respect to the horizontal, a wall portion 61 extending perpendicularly upward from the left end edge position of the bottom portion 60, and a wall portion 62 extending perpendicularly upward from the back end edge of the bottom portion 60, being perpendicular to the bottom portion 60. The wall portion 61 is arranged to be perpendicular to the wall portion 62. The bottom portion 60 and the wall portion 61 extend in the front-back direction. The wall portion 62 extends perpendicularly with respect to the front-back direction. In the reject unit 13, the paper sheets S that are to be sequentially fed from the transport unit 21 are stacked on the bottom portion 60 from bottom to top.

As shown in FIG. 2, the partition card S(b) has a rectangular shape. The length of the partition card S(b) in the long-side direction is substantially equal to the length of the longest banknote S(a) in the long-side direction. Therefore, the partition card S(b) has a length substantially equal to or slightly longer than the banknotes S(a).

The partition card S(b) is set in the loading unit 12 such that the long sides thereof follow the wall portion 41 and the short sides thereof follow the wall portion 42. The loading unit 12 conveys the partition card S(b) and the banknotes S(a), both of which are the paper sheets S, toward the wall portion 41 along the short sides thereof and takes the paper sheets S into the banknote processing device 11. The transport unit 21 also transports the partition card S(b) and the banknote S(a) such that each moves along the short-side direction thereof.

Figure 3:
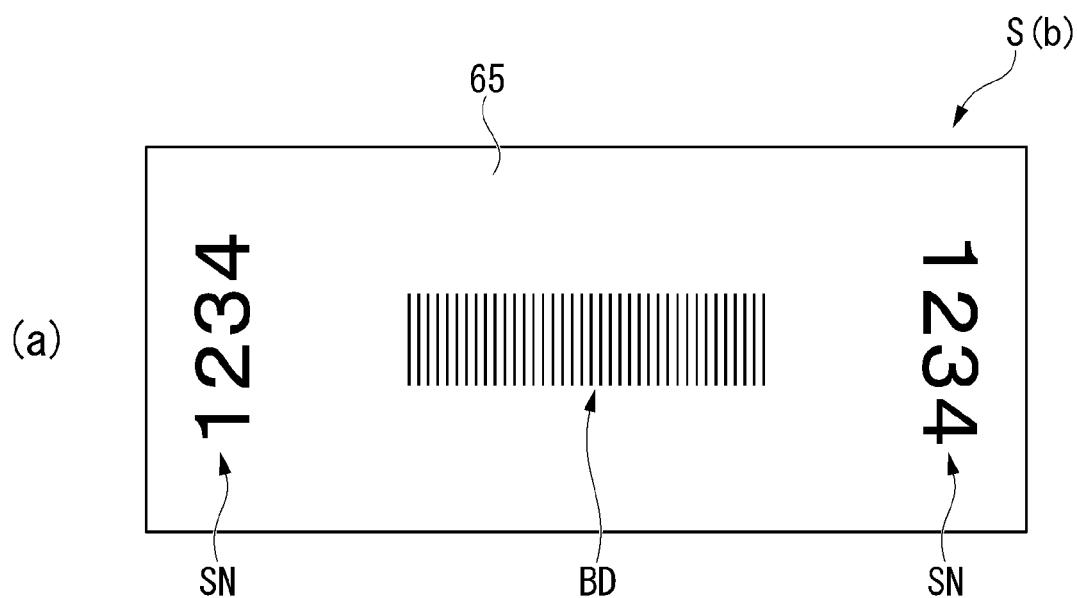
FIG. 3 shows the partition card processed by the banknote processing system of the embodiment, with (a) being a front view and (b) being a back view.
Figure 3:
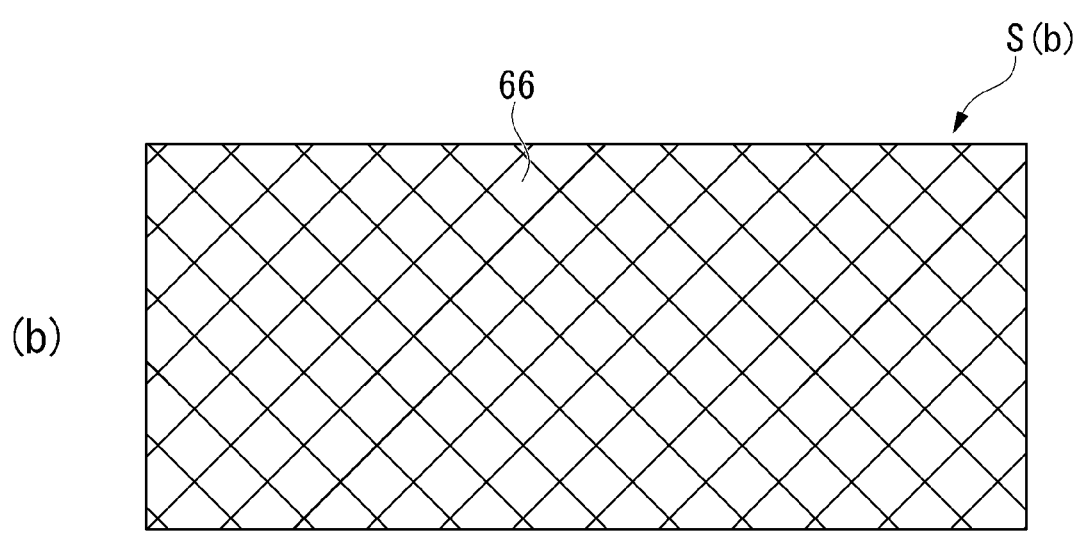

As shown in FIG. 3, the base color of the front surface 65 of the partition card S(b) is white. On this front surface 65 printed in black ink are barcode data BD and a serial number SN that is an identification number. The base color of the back surface 66 of the partition card S(b) has color. In other words, the base color of the back surface 66 is colored. The color of the back surface 66 is, for example, red or blue. Therefore, the front surface 65 and back surface 66 of the partition card S(b) can be distinguished by visual observation of the base color. Of course, the base color of the front surface 65 may be colored, and the base color of the rear surface 66 may be white. That is, the partition card S(b) only needs to have the base color be colored on one of the front surface 65 and the back surface 66. Note that neither the barcode data BD nor the serial number SN is printed on the back surface 66.

The barcode data BD is image data that cannot be discerned by direct viewing by a human observer. In other words, the barcode data BD can only be discerned by a human using a machine. The barcode data BD is displayed at the center in the long-side direction and at the center in the short-side direction of the partition card S(b). The barcode data BD is displayed so that a plurality of bars extending in the short-side direction of the partition card S(b) are arranged in the long-side direction of the partition card S(b). The entire barcode data BD is displayed so as to extend along the long-side direction of the partition card S(b).

The serial number SN is image data that can be discerned by direct viewing by a human observer. In other words, the serial number SN can be discerned by a human without using a machine. The serial number SN is displayed in the form of characters. The serial number SN is specifically composed of alphanumeric characters. Therefore, the serial number SN that can be visually discerned is given on the front surface 65, which is one surface of the partition card S(b). In other words, the serial number SN included in the barcode data BD is given on the front surface 65 of the partition card S(b) in alphanumeric characters so as to be discernable by direct viewing by a human. The serial number SN is, for example, a four-digit alphanumeric in the range of 0001 to FFFF. In the example of FIG. 3, the serial number SN is "1234" composed of four alphanumeric characters.

The serial number SN is printed at two locations on the front surface 65 of the partition card S(b). One serial number SN is displayed near one short side of the partition card S(b). With this one short side facing upward, the one serial number SN is displayed so as to be read sequentially from left to right along the short side. The other serial number is displayed near the other short side of the partition card S(b). With this other short side facing upward, the other serial number is displayed so as to be read from left to right along this short side.

The barcode data BD may be printed on both surfaces 65 and 66 of the partition card S(b). Also, the serial number SN may be printed on both surfaces of the partition card S(b). Therefore, it is sufficient that the barcode data BD, which cannot be discerned by viewing, be given on at least one side of the partition card S(b). Further, it is sufficient that the serial number SN, which can be discerned by viewing, be given on at least one surface of the partition card S(b). In the above description, the serial number SN included in the barcode data BD was described, but the barcode data BD and the serial number SN may be exactly the same. The barcode data BD only needs to be discernable by a machine, and may be, for example, two-dimensional barcode data as image data.

As shown in FIG. 1, the banknote processing system 10 includes a video camera 71 (imaging means) and a video recorder 72 (recording means). The video camera 71 can capture color images as a moving image. The video camera 71 can image the banknote processing device 11 and the periphery of a transaction operation clerk performing a transaction operation on the banknote processing device 11 on the front side of the banknote processing device 11. The video recorder 72 records the imaging data captured by the video camera 71. The video camera 71 can image the serial number of the partition card S(b). The video recorder 72 records the imaging data in which the serial number is imaged.

In addition, the banknote processing system 10 includes a higher-order terminal device 81, the above-described partition card S(b), and a barcode reader 82. The higher-order terminal device 81 is connected as a higher-order component to the banknote processing device 11 and used for inputting the sales slip data. The partition card S(b) is used for determining the boundary between banknote blocks B(a) of sales proceeds. The barcode reader 82 is connected to the higher-order terminal device 81 and reads barcode data BD given on the front surface 65 of the partition card S(b). The banknote processing device 11 and the higher-order terminal device 81 are connected by a communication cable so that necessary information data can be communicated between the banknote processing device 11 and the higher-order terminal device 81.

Further, the banknote processing system 10 includes a video camera 85 (imaging means), a video recorder 86, and a housing box 91. The video camera 85 can capture color images as a moving image. The video camera 85 is capable of imaging the higher-order terminal device 81 and the periphery of the manager performing an operation thereon on the front side thereof. The video camera 85 is capable of imaging the housing box 91 and the periphery of the manager performing an operation thereon on the front side thereof. The video recorder 86 records imaging data captured by the video camera 85. The housing box 91 can store the paper sheet group G.

Next, transaction processing performed using the banknote processing system 10 will be described step by step.

[1] Registration Process

First, as shown in FIG. 2, the manager who is the operator of the higher-order terminal device 81 arranges the partition card S(b) on one of the outer sides in the stacking direction of each of a plurality of banknote blocks B(a) of the sales proceeds that have been collected, and houses each in the predetermined housing box 91 shown in FIG. 1. The housing box 91 houses the plurality of banknote blocks B(a) arranged in alignment with the stacking direction of the banknotes S(a).

When housing a plurality of banknote blocks B(a) in the housing box 91, the manager inserts the partition card S(b) on the side of the banknote block B(a) at one end of the plurality of banknote blocks B(a) opposite the other banknote blocks B(a), and into each boundary between the plurality of banknote blocks B(a). At this time, the partition card S(b) arranged on the side of the banknote block B(a) at one end of the plurality of banknote blocks B(a) opposite the other banknote blocks B(a) is oriented to face the outside, which is the opposite side of the banknote block B(a). The front and back of the remaining partition cards S(b) are also aligned with this partition card S(b). Then, the banknote block B(a) arranged adjacent to the back surface 66 side of the partition card S(b) becomes the banknote block B(a) corresponding to that partition card S(b). In the housing box 91, the partition card S(b) is individually provided for each of the banknote blocks B(a).

In other words, the manager arranges the partition card S(b) so that the front surface 65 thereof faces the opposite side with respect to the corresponding banknote block B(a) while the back surface 66 faces the corresponding banknote block B(a). That is, when inserted into the housing box 91 by the manager, the orientations of the partition cards S(b) are aligned so that the front surface 65 of each faces the same fixed direction with respect to the corresponding banknote block B(a).

As described above, a plurality of paper sheet groups G each including the partition card S(b) and the banknote block B(a) are arranged in the housing box 91. Note that although not shown, a plurality of partition plates that can move in the stacking direction of the banknotes S(a), for example, are provided in the housing box 91. When housing paper sheet groups G in the housing box 91, the manager arranges and interposes the partition plate at a position between one paper sheet group G and one paper sheet group G that are adjacent, at a position corresponding to the thicknesses thereof. The manager performs this at every position between one paper sheet group G and one paper sheet group G that are adjacent. Thereby, the plurality of paper sheet groups G housed in the housing box 91 can each be separated and sorted from the other paper sheet groups G by the partition plate.

Subsequently, the manager operates the higher-order terminal device 81 to input information data stated in the sales slip data, which is attached to each sales amount, to the higher-order terminal device 81 via the keyboard. Along with this, the manager reads with the barcode reader 82 the barcode data BD given on the partition card S(b) corresponding to the banknote block B(a) of each sales amount. Then, an associating operation of associating the information data corresponding to each sales amount sorted in the housing box 91 with the barcode data BD inscribed on the partition card S(b) in a one-to-one manner and storing the information in the higher-order terminal device 81 is performed.

That is, the manager operates the higher-order terminal device 81 to input to the higher-order terminal device 81, via the keyboard, the information data stated in the slip data attached to a first banknote block B(a) which is at one end of the plurality of banknote blocks B(a) and has a first partition card S(b) arranged on the opposite side of the other banknote blocks B(a). Along with this, the manager causes the barcode reader 82 to read the barcode data BD given on the exposed front surface 65 of the first partition card S(b). After that, the manager performs a finalization operation on the higher-order terminal device 81. Then, the higher-order terminal device 81 stores the information data corresponding to the first banknote block B(a) and the barcode data BD given on the first partition card S(b) in one-to-one correspondence.

Next, the first partition card S(b) and the first banknote block B(a) are separated from a second partition card S(b) adjacent to the first banknote block B(a) at the opposite side of the first partition card S(b), to expose the front surface 65 of the second partition card S(b).

Then, the manager operates the higher-order terminal device 81 to input to the higher-order terminal device 81, via the keyboard, the information data stated in the slip data attached to a second banknote block B(a) which is adjacent to the second partition card S(b) at the opposite side of the first banknote block B(a). Along with this, the manager causes the barcode reader 82 to read the barcode data BD given on the exposed front surface 65 of the second partition card S(b). After that, the manager performs a finalization operation on the higher-order terminal device 81. Then, the higher-order terminal device 81 stores the information data corresponding to the second banknote block B(a) and the barcode data BD given on the second partition card S(b) in one-to-one correspondence.

The above association operation is performed for all combinations of the partition card S(b) and the banknote block B(a) in the housing box 91.

At the time of this associating operation, the video camera 85 images the higher-order terminal device 81 and the periphery of the manager, and the video recorder 86 stores the imaging data. Note that with respect to the housing box 91 which is arranged at a predetermined arrangement position during the associating operation, the video camera 85 is installed at a position to be capable of also imaging the housing box 91. When the manager reads the barcode data BD on the front surface 65 of the partition card S(b) in the housing box 91 with the barcode reader 82 as described above, the video camera 85 is arranged at a position of imaging the serial number SN of the front surface 65 of the partition card S(b).

Here, the information data stated in the slip data is, specifically, customer information of the seller and the sales proceeds amount, the store code, the account number for transfer, and the like.

Next, the manager hands over to the transaction operation clerk of the banknote processing device 11 the storage box 91, in which the paper sheet group G including the banknote block B(a) and the partition card S(b) of each sales amount are sorted and housed as described above. Then, the work is taken over by the transaction operation clerk, and thereafter, the transaction operation clerk performs the transaction operation.

[2] Process of Counting Sales Proceeds

Work rules are defined for the transaction operation clerk who operates the banknote processing device 11 to first take out from the housing box 91 the paper sheet groups G, each of which is a set of the partition card S(b) and the banknote block B(a), one by one, hold the partition card S(b) up to the video camera 71 at each removal so that the number of the serial number SN inscribed thereon appears in the video camera 71, and then, after storing the imaging data in the video recorder 72, perform loading into the loading unit 12 of the banknote processing device 11.

Work rules are also defined for the transaction operation clerk to load the paper sheet groups G, each of which is a set of the partition card S(b) and the banknote block B(a), into the loading unit 12 of the banknote processing device 11, with the partition card S(b) of each on the lower side and moreover the front surface 65 thereof facing down (in other words, the back surface 66 faces up).

Accordingly, the transaction operation clerk first takes out the first paper sheet group G, which is a set of the first partition card S(b) and the first banknote block B(a), housed in the housing box 91 received from the manager as described above. Then, the transaction operation clerk, for example in a state of being gathered together, holds the first partition card S(b) up to the video camera 71 so that the number of the inscribed serial number SN is imaged in the video camera 71, thereby storing the imaging data including the serial number SN in the video recorder 72.

Subsequently, the transaction operation clerk loads the first paper sheet group G in the loading unit 12 of the banknote processing device 11, and among the first partition card S(b) and the first paper sheet block B(a), the first partition card S(b) is on the lower side with the front surface 65 thereof facing down. Then, the front surface 65 of the first partition card S(b) comes into contact with the bottom portion 40 of the loading unit 12. The video camera 71 images the transaction operation clerk performing the loading operation of the first paper sheet group G into the loading unit 12. The video recorder 72 records this imaging data.

In this state, the transaction operation clerk presses the count button of the operation display unit 31 of the banknote processing device 11. Then, the loading unit 12 of the banknote processing device 11 takes into the interior of the banknote processing device 11 the first partition card S(b) and the first banknote block B(a) in order from the bottom, that is, in the order of first the first partition card S(b) and next the banknotes S(a) of the first banknote block B(a) one by one, to be transported by the transport unit 21 and identified by the identification unit 22. Then, the normal banknotes S(a) identified by the identification unit 22 as normal banknotes S(a) to be counted are transported to one of the stacking units 14 set for the first banknote block B(a) and stacked.

On the other hand, the first partition card S(b) and the reject banknotes S(a) identified by the identification unit 22 are removed to the reject unit 13 by the transport unit 21. Therefore, the first partition card S(b) in the first sheet group G is first removed to the reject unit 13. At that time, the first partition card S(b) comes into contact with the bottom portion 60 of the reject unit 13, with the back surface 66 thereof facing downward. Thereafter, reject banknotes S(a) are stacked on the first partition card S(b).

Here, if there are no reject banknotes S(a), with only the first partition card S(b) that was loaded into the loading unit 12 being transported to the reject unit 13 and all the banknotes S(a) of the first banknote block B(a) being transported to the stacking unit 14, and thereby there are no longer any paper sheets S in the loading unit 12, the counting process is completed for the first paper sheet group G, which is the set of the first partition card S(b) and the first banknote block B(a).

Next, the transaction operation clerk takes out the second paper sheet group G, which is a set of the second partition card S(b) and the second banknote block B(a), housed in the housing box 91, and in a state of being gathered together, holds the second partition card S(b) up to the video camera 71 so that the number of the inscribed serial number SN is imaged in the video camera 71, thereby storing the imaging data thereof in the video recorder 72.

Subsequently, the transaction operation clerk loads the second paper sheet group G in the loading unit 12 of the banknote processing device 11 while, among the second partition card S(b) and the second paper sheet block B(a), the second partition card S(b) is on the lower side with the front surface 65 thereof facing down. Then, the front surface 65 of the second partition card S(b) comes into contact with the bottom portion 40 of the loading unit 12. The video camera 71 images the transaction operation clerk performing the loading operation of the second paper sheet group G into the loading unit 12. The video recorder 72 records the imaging data.

In this state, the transaction operation clerk presses the count button of the operation display unit 31 of the banknote processing device 11. Then, in the banknote processing device 11, the loading unit 12 takes into the interior of the banknote processing device 11 the second partition card S(b) and the second banknote block B(a) in order from the bottom, that is, first the second partition card S(b) and next the banknotes S(a) of the second banknote block B(a) one by one in sequence, to be transported by the transport unit 21 and identified by the identification unit 22. Then, the normal banknotes S(a) identified by the identification unit 22 as normal banknotes S(a) to be counted are transported to one of the stacking units 14 set for the second banknote block B(a) and stacked, the stacking unit 14 differing from the one set for the first banknote block B(a).

On the other hand, the second partition card S(b) and the reject banknotes S(a) identified by the identification unit 22 are removed to the reject unit 13 by the transport unit 21 and stacked. At that time, the second partition card S(b) in the second paper sheet group G is first removed to the reject unit 13, and at that time, the back surface 66 thereof faces downward, thereby coming into contact with the bottom portion of the reject unit 13. Thereafter, reject banknotes S(a) are stacked on the second partition card S(b).

Here, if there are no reject banknotes S(a), with only the second partition card S(b) that was loaded into the loading unit 12 being transported to the reject unit 13, and all the banknotes S(a) of the second banknote block B(a) being transported to the stacking unit 14, and thereby there are no longer any paper sheets S in the loading unit 12, the counting process is completed for the second paper sheet group G.

Thereafter, similarly, the transaction operation clerk takes out the paper sheet groups G, each of which is a set of the partition card S(b) and the banknote block B(a), one by one from the storage box 91. For each set of the paper sheet group G, the transaction operation clerk holds the partition card S(b) up to the video camera 71 so that the number of the inscribed serial number SN is imaged, and the imaging data thereof is stored in the video recorder 72.

Subsequently, after being loaded in the loading unit 12 with the partition card S(b) on the lower side and the front surface 65 thereof facing down, the count button is pressed. Then, the banknote processing device 11 takes in the paper sheet groups G from the loading unit 12 and for each set performs a counting process that stacks the normal banknotes S(a) identified as normal banknotes S(a) to be counted by the identification unit 22 in the corresponding one of the stacking units 14, and removes the partition card S(b) and the reject banknotes S(a) to the reject unit 13.

In this way, the above operation is repeatedly performed on all of the paper sheet groups G, each of which is a set of the partition card S(b) and the banknote block B(a), in the housing box 91. Then, when all the counting operations are completed, the transaction operation clerk presses the completion button of the operation display unit 31 of the banknote processing device 11 to perform the completion operation.

Then, the higher-order terminal device 81 recognizes that the completion operation has been performed in the banknote processing device 11, and the higher-order terminal device 81 imports from the banknote processing device 11, by communication via the communication cable, the individual count data obtained by performance of the transaction operation. Then, when the manager performs a completion operation on the higher-order terminal device 81 side, the higher-order terminal device 81 individually performs a collation of the counted sum, obtained by the operation performed by the transaction operation clerk, which is the result of counting the normal banknotes S(a) corresponding to the serial number SN inscribed on the partition card S(b), and the sales proceeds corresponding to the same serial number SN as the serial number SN inscribed on the partition card S(b), registered at the higher-order terminal device 81 during the registration process performed in advance by the manager.

In this way, the counting process is completed when the counting result performed by the banknote processing device 11 is confirmed with the result of collation by the higher-order terminal device 81, for all the paper sheet groups G in the housing box 91 by the transaction operation clerk.

During the counting operation of each set of the paper sheet groups G, the reject banknotes S(a) identified by the identification unit 22 as other than normal banknotes S(a) are removed to the rejection unit 13 to be stacked together with the partition card S(b). Since the count of the reject banknotes S(a) has not been finalized, the transaction operation clerk needs to extract the rejected banknotes S from the reject unit 13 and reload the rejected banknotes S into the loading unit 12 to perform a recounting operation.

At this time, the partition card S(b) identified at the front of the banknote block B(a) and removed to the reject unit 13 is also extracted. Then, in the same manner as in the above-described operation, the transaction operation clerk, among the set of the partition card S(b) and the reject banknotes S(a), holds the partition card S(b) up to the video camera 71 so that the number of the serial number SN inscribed thereon appears in the video camera 71, with the imaging data being stored in the video recorder 72.

The transaction operation clerk then loads the partition card S(b) and the reject banknotes S(a) into the loading unit 12 of the banknote processing device 11, with the partition card S(b) on the lower side and the front surface 65 of the partition card S(b) facing down, and presses the count button (not shown). The video camera 71 also images the transaction operation clerk performing the loading operation of the partition card S(b) and the reject banknotes S(a). The imaging data is stored in the video recorder 72. In this way, when the reject banknotes S(a) that are transported to the reject unit 13 are completely eliminated so that all the banknotes S(a) are transported to the stacking units 14, the counting process by the banknote processing device 11 is completed.

Here, the video camera 71 images a scene in which a block including the partition card S(b) and the reject banknotes S(a) extracted from the reject unit 13 is reset in the loading unit 12. The video recorder 72 stores the imaging data of this imaging.

For example, the transaction operation clerk takes out the set of the first partition card S(b) and the reject banknotes S(a) of the first banknote block B(a) from those taken out from the reject unit 13, holds the first partition card S(b) up to the video camera 71 so that the number of the serial number SN inscribed thereon appears in the video camera 71, and stores the imaging data in the video recorder 72.

Subsequently, the transaction operation clerk loads the first partition card S(b) and the reject banknotes S(a), which are a set, into the loading unit 12 of the banknote processing device 11, with the first partition card S(b) on the lower side and moreover the front surface 65 thereof facing down. Then, the front surface 65 of the first partition card S(b) comes into contact with the bottom portion 40 of the loading unit 12. The video camera 71 also images the transaction operation clerk performing the loading operation of the first partition card S(b) and the reject banknotes S(a), with the imaging data stored in the video recorder 72.

In this state, the transaction operation clerk presses the count button of the operation display unit 31 of the banknote processing device 11. Then, the loading unit 12 of the banknote processing device 11 takes into the interior of the banknote processing device 11 the first partition card S(b) and the reject banknotes S(a) in order from the bottom, that is, in the order of first the first partition card S(b) and next the reject banknotes S(a) one by one, to be transported by the transport unit 21 and identified by the identification unit 22.

Then, the normal banknotes S(a) identified by the identification unit 22 as normal banknotes to be counted are transported to the corresponding one of the stacking units 14 to be stacked. In this way, when the reject banknotes S(a) transported to the reject unit 13 are completely eliminated and all the banknotes S(a) are transported to the stacking units 14, the counting process by the banknote processing device 11 for the first partition card S(b) and the first banknote block B(a) is completed.

Next, the transaction operation clerk takes out the set of the second partition card S(b) and the reject banknote S(a) of the second banknote block B(a) from those taken out from the reject unit 13, holds the second partition card S(b) up to the video camera 71 so that the number of the serial number SN inscribed thereon appears in the video camera 71, and stores the imaging data in the video recorder 72.

Subsequently, the transaction operation clerk loads the second partition card S(b) and the reject banknotes S(a), which are a set, into the loading unit 12 of the banknote processing device 11, with the second partition card S(b) on the lower side and moreover the front surface 65 thereof facing down. Then, the front surface 65 of the second partition card S(b) comes into contact with the bottom portion 40 of the loading unit 12. The video camera 71 also images the transaction operation clerk performing the loading operation of the second partition card S(b) and the reject banknotes S(a), with the imaging data being stored in the video recorder 72.

In this state, the transaction operation clerk presses the count button of the operation display unit 31 of the banknote processing device 11. Then, the loading unit 12 of the banknote processing device 11 takes into the interior of the banknote processing device 11 the second partition card S(b) and the reject banknotes S(a) in order from the bottom, that is, in the order of first the second partition card S(b) and next the reject banknotes S(a) one by one, to be transported by the transport unit 21 and identified by the identification unit 22.

Then, the normal banknotes S(a) identified by the identification unit 22 as normal banknotes to be counted are transported to the corresponding one of the stacking units 14 and stacked. In this way, when the reject banknotes S(a) transported to the reject unit 13 are completely eliminated and all the banknotes S(a) are transported to the stacking units 14, the counting process by the banknote processing device 11 for the second partition card S(b) and the second banknote block B(a) is completed.

Above has been described with an example the case where each set (each group) of the paper sheet groups G, each being a set of the partition card S(b) and the banknote block B(a), is loaded into the loading unit 12 to perform the counting process. It is also possible to collectively input a plurality of sets of paper sheet groups G into the loading unit 12 to perform the counting process. At that time, those between a preceding partition card S(b) and the next partition card S(b) is identified as the banknote block B(a) of the set with the preceding partition card S(b). In this case, the normal banknotes S(a) are stacked in different stacking units 14 for each banknote block B(a), while the reject banknotes S(a) of all the banknote blocks B(a) are collectively stacked in the reject unit 13 together with the corresponding partition cards S(b). Also in this case, the video camera 71 images the transaction operation clerk loading the plurality of paper sheet groups G into the loading unit 12, with the imaging data being stored in the video recorder 72.

When a plurality of paper sheet groups G are counted continuously at one time in this way, a plurality of sets of partition cards S(b) and reject banknotes S(a) of the banknote blocks B(a) stacked in the reject unit 13 are collectively loaded in the loading unit 12 and the counting process is performed again. The reject banknotes S(a) between a preceding partition card S(b) and the next partition card S(b) are identified as those of the banknote block B(a) of the set with the preceding partition card S(b).

During this operation, there is a risk of the transaction operation clerk mistakenly extracting the partition card S(b) and the reject banknotes S(a) from the reject unit 13. Moreover, even if the transaction operation clerk has correctly extracted the partition card S(b) and the reject banknotes S(a) from the reject unit 13, there is a risk of the transaction operation clerk incorrectly setting the orientation during reloading into the loading unit 12. In particular, when a reject banknote S(a) occurs in a plurality of banknote blocks B(a) during collective counting of a plurality of sets of the partition card S(b) and the banknote block B(a) as described above, such a likelihood increases.

However, among the partition cards S(b) and the reject banknotes S(a) that are sequentially stacked in the reject unit 13, those at the lower layer of the reject unit 13 were taken into the banknote processing device 11 from the loading unit 12 first, while those at the upper layer of the reject unit 13 were taken into the banknote processing device 11 from the loading unit 12 afterward, so they can be recognized at a glance.

Further, as described above, since only the back surface 66 of the partition card S(b) is colored red, blue, or the like, even if, for example, a plurality of reject banknotes S(a) that occurred during the collective counting of a plurality of banknotes blocks B(a) are collectively extracted at once from the reject unit 13, this back surface 66 of the colored partition card S(b) serves as a mark, and so provided there is no error in recognizing which banknotes in either direction with respect to the back surface 66, which is the colored surface, belong to the banknote block B(a) corresponding to the partition card S(b), the risk of error is eliminated.

Also, for example, in the case of counting a banknote block B(a) of a total of for example 100,000 yen, which is set with the partition card S(b) having the serial number SN of for example "1234", and a single reject banknote S of 10,000 yen occurs in the first counting process, then the first counting of the partition card S(b) having the serial number SN "1234" is 90,000 yen, and if the second counting in which the rejected 10,000 yen banknote is recognized as a normal counting target by recounting with the partition card S(b) having the serial number SN of "1234" is 10,000 yen, the total becomes 100,000 yen, and so the calculation is correct. This calculation may be performed on the banknote processing device 11 side, or may be performed on the higher-order terminal device 81 side.

Even if the reject banknotes S(a) stacked in the reject unit 13 are re-counted as described above so that all the banknotes S(a) in the banknote block B(a) are normally counted, as a result of the collation by the higher-order terminal device 81, on rare occasions the counting result will not match the sales proceeds corresponding to the serial number SN inscribed on the partition card S(b). In such a case, since the banknote block B(a) for which the collation did not match can be specified, the manager calls up the registration screen used when performing the registration processing in [1] above, confirms and accordingly records the customer information of the seller (contact details and the like), the sales proceeds amount, the store code, and the account number for transfer, which are information data on the slip associated with that serial number SN, and informs the seller that the amount stated on the slip and the amount of counted money did not match. Then, after obtaining the authorization of the seller, a correction process is performed in which the amount of the slip that does not match is amended to the amount of money actually counted to match the collation.

[3] Video Camera Imaging Process and Imaging Data Recording Process

A series of operations performed by the transaction operation clerk have been described above. The imaging process by the video camera 71 and the imaging data recording process by the video recorder 72 are always started from the point at which the transaction operation clerk starts an operation on the banknote processing device 11 and continuously executed without fail until the banknote block B(a) counting operation ends, the result of collation with the higher-order terminal device 81 is confirmed and the removal operation is completed.

The video data thus recorded is stored on a hard disk of a PC terminal (not shown) and preserved. In other words, even if the transaction operation clerk makes a suspicious movement that is deemed to be fraudulent, or makes an operation error on the banknote processing device 11, the situation at that time is all recorded as video data.

[4] Mechanism of Video Camera Imaging Process and Work Rule Compliance

Above, a description as given including the work rules related to the operation of the transaction operation clerk. Operation guards will be described for the case in which such work rules are not observed. In the banknote processing system 10, a mechanism for performing image analysis of imaging data captured by the video camera 71 is provided in the control unit 32. The mechanism particularly analyzes movements of human hands and the surface 65 of the partition card S(b).

That is, the control unit 32 causes an audio output unit (not shown) of the operation display unit 31 to issue an alarm upon detecting, from the imaging data in the video camera 71, that the transaction operation clerk has loaded the paper sheet group G, which is a set of the partition card S(b) and the paper sheet block B(a), into the loading unit 12 of the banknote processing device 11 without holding the paper sheet group G up to the video camera 71 so that the number of the serial number SN inscribed on the partition card S(b) appears in the video camera 71. Note that not only a warning sound but also a warning lamp may be turned on as an alarm. The alarm allows the transaction operation clerk to notice that an error in operation has been committed.

Moreover, if the transaction operation clerk loads the paper sheet group G, which is a set of the partition card S(b) and the banknote block B(a), into the loading unit 12 of the banknote processing device 11 without holding the paper sheet group G up to the video camera 71 so that the number of the serial number SN appears in the video camera 71 and performs the deposit counting operation without noticing the above-described alarm, the control unit 32 is equipped with a mechanism to detect the incorrect deposit counting operation and invalidate the transaction operation.

As an example of the invalidation control performed by the control unit 32, when the identification unit 22 newly detects the partition card S(b), the control unit 32 stops the subsequent take-in operation of the paper sheet S by the loading unit 12, rejects the partition card S(b) to the reject unit 13, and also rejects all the banknotes S(a) on the transport unit 21 to the reject unit 13 so that the counting operation itself is invalidated. That is, upon detecting that the banknote processing device 11 has started the counting operation in a state where the video camera 71 has not imaged the serial number SN, the control unit 32 invalidates the counting operation of the paper sheet block B(a) corresponding to the partition card S(b) newly detected by the identification unit 22.

[5] Confirmation of Video Data Playback

Some sellers who are notified that the sales slip amount and the amount of money counted by the banknote processing system 10 do not match cannot accept the contents of the communication from the cash center. At times, they may visit the cash center and request a detailed explanation of the situation. In such a case, the person in charge of the cash center presents the relevant portion recorded on the higher-order terminal device 81 with respect to the sales proceeds of the seller, and explains that the amount stated in the slip does not match the counted amount of money.

In addition, for a seller who is still unable to accept that arrangement, along with presenting the serial number SN which is information obtained when counting the sales proceeds of the seller, the video data of the corresponding portion is played back from the video recorder 72. By letting the seller view the video data during the period from when the partition card S(b) of that serial number SN is held over the video camera 71 to when the counting is completed, it is possible to get the seller to confirm that the transaction operation clerk did not commit any wrongdoing.

Although the above embodiment is provided with both the video camera 71 that images the banknote processing device 11 and the periphery of the operation clerk who performs the transaction operation on the banknote processing device 11, and the video camera 85 that images the higher-order terminal device 81 and the periphery of the manager, only the video camera 71 among the video cameras 71 and 85 may be provided.

The above-mentioned banknote processing system 10 includes the video camera 71 capable of imaging the banknote processing device 11 and the periphery of the transaction operation clerk operating the banknote processing device 11, and the video recorder 72 for recording imaging data of the video camera 71. Further, a serial number SN that can be visually identified is inscribed on the front surface 65 of the partition card S(b). Then, when the video camera 71 images the serial number SN, the video recorder 72 stores the imaging data. Thereby, when recording imaging data of a scene in which the transaction operation clerk is counting banknote blocks B(a) with the banknote processing device 11, since the serial number SN inscribed on the partition card S(b), which can specify which banknote block B(a) is being counted, is also recorded, diversification of the management information becomes possible. Therefore, for example, when there is a complaint from a seller about the sales amount not matching the slip amount, the imaging data that is the target record can be specified, whereby viewing thereof by the seller is possible.

When the banknote processing system 10 detects that the banknote processing device 11 has started the counting operation in a state where the video camera 71 has not imaged the serial number SN, the control unit 32 issues an alarm from the operation display unit 31. Thereby, an effect is brought about in which the operator is made to thoroughly implement the work rule of always holding up to the video camera 71 the serial number SN of the partition card S(b) prior to counting the banknote block B(a) with the banknote processing device 11.

Moreover, when the banknote processing system 10 detects that the banknote processing device 11 has started the counting operation in a state where the video camera 71 has not imaged the serial number SN, the control unit 32 invalidates the counting operation of the banknote block B(a) corresponding to the partition card S(b) newly detected by the identification unit 22. Thereby, before the banknote block B(a) is counted by the banknote processing device 11, when the work rule of always holding up to the video camera 71 the serial number SN of the partition card S(b) is not followed, the control unit 32 invalidates the counting operation. For this reason, it becomes possible to stop a transaction operation that violates the work rules and start over. In addition, as an example of the invalidation control performed by the control unit 32, when the identification unit 22 newly detects the partition card S(b), the control unit 32 may stop the subsequent take-in operation of the paper sheet S by the loading unit 12, reject the partition card S(b) to the reject unit 13, and also reject all the banknotes S(a) on the transport unit 21 to the reject unit 13 so that the counting operation cannot be normally completed.

The banknote processing system 10 includes, in addition to the video camera 71 that images the banknote processing device 11 and the periphery of the transaction operation clerk, the video camera 85 that images the higher-order terminal device 81 connected as a higher-order component to the banknote processing device 11 and the periphery of the manager who is the operator of the higher-order terminal device 81. The video recorder 86 records the imaging data of the video camera 85. Thereby, not only the transaction operation clerk who operates the banknote processing device 11 but also the operation state of the manager who is the operator of the higher-order terminal device 81 can be imaged and recorded.

Further, in the banknote processing system 10, the partition card S(b) has a white base color on one surface 65 and a colored base color on the other back surface 66. The video camera 71 images the scene in which a block including the partition card S(b) and the reject banknotes S(a) extracted from the reject unit 13 is reset in the loading unit 12, while the video recorder 72 records this imaging data of the imaging. As a result, imaging and recording are performed as to whether or not an operation error has occurred when a reject banknote S(a) has occurred.

Here, in the reject unit 13, the partition card S(b) fed from the loading unit 12 is inverted so that the front surface 65 that was facing down in the loading unit 12 faces up, with the reject banknotes S(a) of the same paper sheet group G being placed on the front surface 65 thereof. For this reason, the relationship between the front surface 65 and the back surface 66 of the partition card S(b) and the reject banknotes S(a) of the same paper sheet group G is opposite to that at the time of loading into the loading unit 12. Therefore, mistakes are likely to occur when resetting in the loading unit 12. For this reason, the video camera 71 is effective in imaging the scene in which the block including the partition card S(b) and the reject banknotes S(a) extracted from the reject unit 13 is reset in the loading unit 12.

The banknote processing management method when performing banknote processing using the banknote processing system 10 is such that when the banknote block B(a) is set in the loading unit 12, the serial number SN of the partition card S(b) arranged on one of the outer sides of this banknote block B(a) in the stacking direction is imaged by the video camera 71, and this imaging data is recorded in the video recorder 72. Thereby, when imaging data is recorded of the scene in which the transaction operation clerk counts banknote blocks B(a) with the banknote processing device 11, the serial number SN inscribed on the partition card S(b) that can specify which banknote block B(a) is being counted is also recorded. As a result, the management information can be diversified. Therefore, for example, if there is a complaint from a seller about the sales amount not matching the slip amount, it is possible to specify the imaging data that is the target record and allow the seller to view the imaging data.

INDUSTRIAL APPLICABILITY

According to the banknote processing system and to a banknote processing management method described above, diversification of management information is possible.

REFERENCE SYMBOLS

10: Banknote processing system
11: Banknote processing device
12: Loading unit
13: Reject unit
14: Stacking unit
22: Identification unit
31: Operation display unit (notifying means)
32: Control unit (detection means, control means)
65: Front surface (one surface)
66: Back surface (other surface)
71: Video camera (imaging means)
72: Video recorder (recording means)
81: Higher-order terminal device
85: Video camera (imaging means)
86: Video recorder (recording means)
B(a): Banknote block
S(a): Banknote
S(b): Partition card
SN: Serial number (identification number)

The invention claimed is:

1. A banknote processing system comprising:
a banknote processing device, the banknote processing device comprising
a loading unit in which a banknote block is set together with a partition card, the banknote block including banknotes stacked in a stacking direction, the partition card being arranged on one of outer sides of the banknote block in the stacking direction, an identification number that is visually identifiable being inscribed on at least one surface of the partition card,
an identification unit that identifies the banknotes and the partition card taken in from the loading unit,
a stacking unit in which banknotes identified as normal banknotes by the identification unit are stacked, and a reject unit in which reject banknotes identified as other than the normal banknotes by the identification unit and the partition card are stacked;

an imaging unit that images the banknote processing device, a periphery of a transaction operation clerk who is operating the banknote processing device, and the identification number to obtain image data showing the banknote processing device, the periphery of the transaction operation clerk, and the identification number;

a recording unit that records the imaging data;

a detection unit that detects that the banknote processing device has started a counting operation of the banknote block in a state in which the imaging unit has not imaged the identification number; and a notification unit that issues an alarm when the detection unit detects that the banknote processing device has started the counting operation.

2. The banknote processing system according to claim 1, further comprising:

a detection unit that detects that the banknote processing device has started a counting operation of the banknote block in a state in which the imaging unit has not imaged the identification number; and a control unit that invalidates the counting operation when the detection unit detects that the banknote processing device has started the counting operation.

3. The banknote processing system according to claim 1, wherein the imaging unit further images a higher-order terminal device connected as a higher-order component to the banknote processing device and a periphery of an operator of the higher-order terminal device, in addition to the banknote processing device and the periphery of the transaction operation clerk, and the recording unit further records imaging data showing the higher-order terminal device and the periphery of the operator.

4. The banknote processing system according to claim 1, wherein a base color of one surface of the partition card is white and a base color of another surface of the partition card is colored, the imaging unit images a scene in which a block including the partition card and the reject banknotes extracted from the reject unit is reset in the loading unit, and the recording unit stores imaging data showing the scene.

5. A banknote processing method for when performing banknote processing using a banknote processing system, the banknote processing system comprising:

a banknote processing device, the banknote processing device comprising a loading unit in which a banknote block is set together with a partition card, the banknote block including banknotes stacked in a stacking direction, the partition card being arranged on one of outer sides of the banknote block in the stacking direction, an identification unit that identifies the banknotes and the partition card taken in from the loading unit, a stacking unit in which banknotes identified as normal banknotes by the identification unit are stacked, and a reject unit in which reject banknotes identified as other than the normal banknotes by the identification unit and the partition card are stacked;

an imaging unit;

a recording unit;

a detection unit; and a notification unit, the banknote processing method comprising:

using, as the partition card, a partition card on at least one surface of which an identification number that is visually identifiable is inscribed; and when the banknote block is set in the loading unit, causing the imaging unit to image the identification number of the partition card arranged on the one outer side of the banknote block in the stacking direction and causing the recording unit to record therein imaging data showing the identification number;

detecting, by the detection unit, that the banknote processing device has started a counting operation of the banknote block in a state in which the imaging unit has not imaged the identification number; and issuing, by the notification unit, an alarm when the detection unit detects that the banknote processing device has started the counting operation.

* * * * *